(12) United States Patent
Ayirala et al.

(10) Patent No.: US 11,739,620 B1
(45) Date of Patent: Aug. 29, 2023

(54) METHODOLOGY TO IMPROVE THE EFFICIENCY OF GRAVITY DRAINAGE CO2 GAS INJECTION PROCESSES

(71) Applicant: Saudi Arabian Oil Company, Dhahran (SA)

(72) Inventors: Subhash Ayirala, Dhahran (SA); Zuhair AlYousef, Saihat (SA); Dong Kyu Cha, Dhahran (SA); Muhammad Almajid, Qatif (SA); Ming Han, Dhahran (SA); Ali AlYousef, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/651,628

(22) Filed: Feb. 18, 2022

(51) Int. Cl.
*E21B 43/16* (2006.01)
*C09K 8/588* (2006.01)
*C09K 8/594* (2006.01)

(52) U.S. Cl.
CPC ............ *E21B 43/164* (2013.01); *C09K 8/588* (2013.01); *C09K 8/594* (2013.01)

(58) Field of Classification Search
CPC ...................................................... E21B 43/16
See application file for complete search history.

(56) References Cited

U.S. PATENT DOCUMENTS

| | | | |
|---|---|---|---|
| 4,606,407 A | 8/1986 | Shu et al. | |
| 4,941,533 A | 7/1990 | Buller et al. | |
| 5,259,453 A | 11/1993 | Johnston | |
| 5,267,615 A * | 12/1993 | Christiansen | E21B 43/18 166/272.2 |
| 2001/0018972 A1 * | 9/2001 | Bayliss | E21B 33/12 166/305.1 |
| 2008/0125334 A1 | 5/2008 | Burns et al. | |
| 2012/0279727 A1 | 11/2012 | Kakadjian et al. | |
| 2014/0144628 A1 | 5/2014 | Moradi-Araghi et al. | |
| 2014/0202693 A1 | 7/2014 | Guan et al. | |
| 2016/0137906 A1 | 5/2016 | Guan et al. | |
| 2017/0145292 A1 | 5/2017 | Szalai et al. | |

OTHER PUBLICATIONS

D.N. Rao et al., "Development of Gas Assisted Gravity Drainage (GAGD) Process for Improved Light Oil Recovery", InSPE/DOE Symposium on Improved Oil Recovery, Apr. 2004.

(Continued)

*Primary Examiner* — William D Hutton, Jr.
*Assistant Examiner* — Avi T Skaist
(74) *Attorney, Agent, or Firm* — Leason Ellis LLP

(57) ABSTRACT

A method to improve the efficiency of a gravity drainage CO2 gas injection process includes the steps of: (a) injecting a slug proximate to an underground reservoir, wherein the slug comprises a polymer component and an inorganic metal ion type crosslinking agent that are configured to form an in situ weak gel in the reservoir to block high permeability channels in a pay zone of the reservoir; and (b) continuously injecting $CO_2$ gas at a top of the pay zone to form a gas cap at the top of the reservoir and to cause the gas cap to advance rapidly towards a producing well located below to provide a uniform sweep of the gas cap.

10 Claims, 3 Drawing Sheets

(56) References Cited

OTHER PUBLICATIONS

Figure 1:
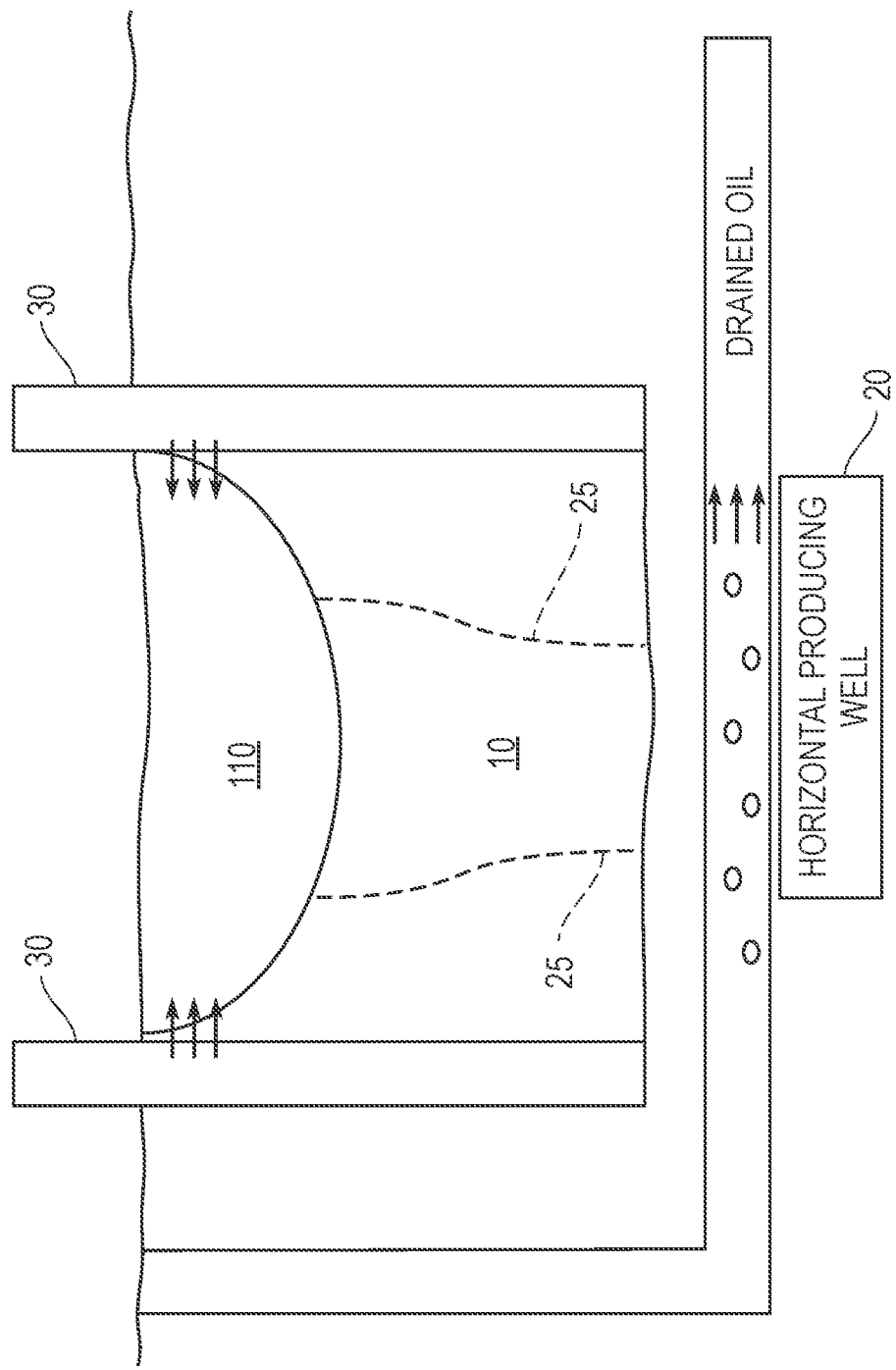

N. Kasiriri et al., "Gas-Assisted Gravity Damaged (GAGD) Process for Improved Oil Recovery", International Petroleum Technology Conference, Dec. 2009.

N. Akhlaghi et al., "Gas Assisted Gravity Drainage by CO2 Injection", Energy Sources, Part A: Recovery, Utilization, and Environmental Effects, Jun. 2012.

A. Jahanbani Ghahfarokhi et al., "Simulation study of application of a water diverting gel in enhanced oil recovery", InSPE Europec featured at 78th EAGE Conference and Exhibition, May 2016.

R.S. Seright et al., "A Survey of Field Applications of Gel Treatments for Water Shutoff", InSPE Latin America/Caribbean Petroleum Engineering Conference, Apr. 1994.

A. Danyalov, "Screening of zonal isolation agents for SAGD EOR applications", (Master's thesis, University of Stavanger, Norway), Jul. 2012.

Jostein Kolnes et al., Abstract Only—"Effect of the Core Material on Gelation of a HPAM / Chromium System at High Temperature", InSPE/DOE Improved Oil Recovery Symposium, Apr. 1996.

K. Skrettingland et al., "Snorre In-Depth Water Diversion—New Operational Concept for Large Scale Chemical Injection from a Shuttle Tanker", InSPE Improved Oil Recovery Conference, Apr. 2016.

R.S. Seright, "Gel Propagation Through Fractures", SPE Production & Facilities, Nov. 2001.

\* cited by examiner

METHODOLOGY TO IMPROVE THE EFFICIENCY OF GRAVITY DRAINAGE CO2 GAS INJECTION PROCESSES

TECHNICAL FIELD

The present disclosure generally relates to a method of treating a wellbore or subterranean hydrocarbon-bearing formation to increase hydrocarbon recovery from the formation, and more particularly to a method to expedite and increase the oil recovery rates from gravity drainage gas injection processes by injecting a gel forming formulation containing a polymer solution and a crosslinking agent to generate an in situ gel in the reservoir.

BACKGROUND

In the production of oil from subterranean formations, it is usually possible to recover only a small fraction of the total oil present in the formation by so-called primary recovery methods which utilize only the natural forces present in the reservoir. To recover oil beyond that which is produced by primary methods, a variety of supplemental production techniques have been employed. Secondary recovery methods rely on the supply of external energy in the form of injecting fluids to increase reservoir pressure, hence replacing or increasing the natural reservoir drive with an artificial drive. Waterflooding, via the injection of water or brine into the reservoir, is another common oil recovery method.

Gravity drainage gas injection processes are widely used for tertiary oil recovery in dipping reservoirs. Some recent studies also show the applicability of this process to even horizontal reservoirs. This technology is basically a top-down process, wherein CO2 is injected at the top of a pay zone using either vertical or horizontal wells to form a gas gap up dip. The CO2 gas is used due to its favorable phase behavior characteristics to interact with oil and cause oil swelling, viscosity reduction and lower gas-oil interfacial tension. At sufficient pressures, CO2 can also develop miscibility conditions with oil by resulting in zero gas-oil interfacial tension to effectively mobilize residual oil in the swept areas. The formed gas cap expands slowly with time to improve the sweep and mobilize some residual oil. The mobilized oil is pushed towards down dip horizontal wells located at the bottom of pay zone through "film flow" and "gravity drainage".

Most gravity drainage projects do not look attractive for field practice due to slow response and low oil recovery rates. These delayed response and low oil recovery rates also consume much higher volume of injection gas for recovering a barrel of oil, which will not be economically feasible. Here we propose a methodology to fasten the oil recovery response as well as increase the production rates from gas gravity drainage processes by allowing the injection of gas at higher rates. If the gas injection rate is increased, it would enable faster recovery response due to the combined effects of forced gravity drainage with free gravity drainage. These favorable effects would enable higher oil production withdrawal rates and thereby increasing ultimate oil recoveries in producing wells.

Gels are commonly used for profile modification and achieve conformance improvement in reservoirs consisting of severe heterogeneity, fractured regions, and high permeability zones. The injection gas will quickly flow through high permeability channels due to much lower resistance to result in early gas breakthrough. The gels are generated in situ in the reservoir by injecting gel forming solutions, since gelling process occurs within the larger pores of reservoir rock. These gelants will preferentially enter the thief zones to form highly viscoelastic gels and block the high permeability channels to reduce their flow capacity. As a result, the subsequently injected gas will not be able to enter the high permeability channel, changes its flow direction, and gets diverted into unswept regions for increased volumetric sweep efficiency.

The present disclosure provides a method that overcomes the deficiencies of prior methods as discussed above.

SUMMARY

In the present disclosure, a methodology is provided to fasten and increase the oil recovery rates from gravity drainage gas injection processes. The method involves the injection of gel forming formulations containing polymer solution and a crosslinking agent to generate in situ gels in the reservoir. The concentrations of polymer and crosslinking agent in the gel forming formulation are chosen in such a way to form weak gels in the reservoir. As is known in the art and as used herein, the term weak gel is a kind of three-dimensional cross-linking system with low polymer concentration and appropriate cross-linking agents, dominated by intermolecular cross-linking, supplemented by intramolecular cross-linking, and with a relatively weak-cross linking degree.

These weak gels of lower gel strength and delayed gelation times can propagate deeper in the reservoir and block the high permeability channels in the pay zone. Such blockage would reduce the overall permeability and subsequently the relative permeability of gas for the CO2 gravity drainage process. As a result, CO2 gas can be injected at higher gas injection rates to form a gas cap quickly at the top of the pay zone. The gas cap would expand with time and a forced gravity drainage would take place to supplement the free gravity drainage and increase the oil drainage rates. These high oil production rates would enable faster as well as higher ultimate recovery in CO2 gravity drainage gas injection processes besides reducing the CO2 gas utilization volumes per barrel of oil recovered, making the overall process more economically sound.

BRIEF DESCRIPTION OF DRAWING FIGURES

Figure 2:
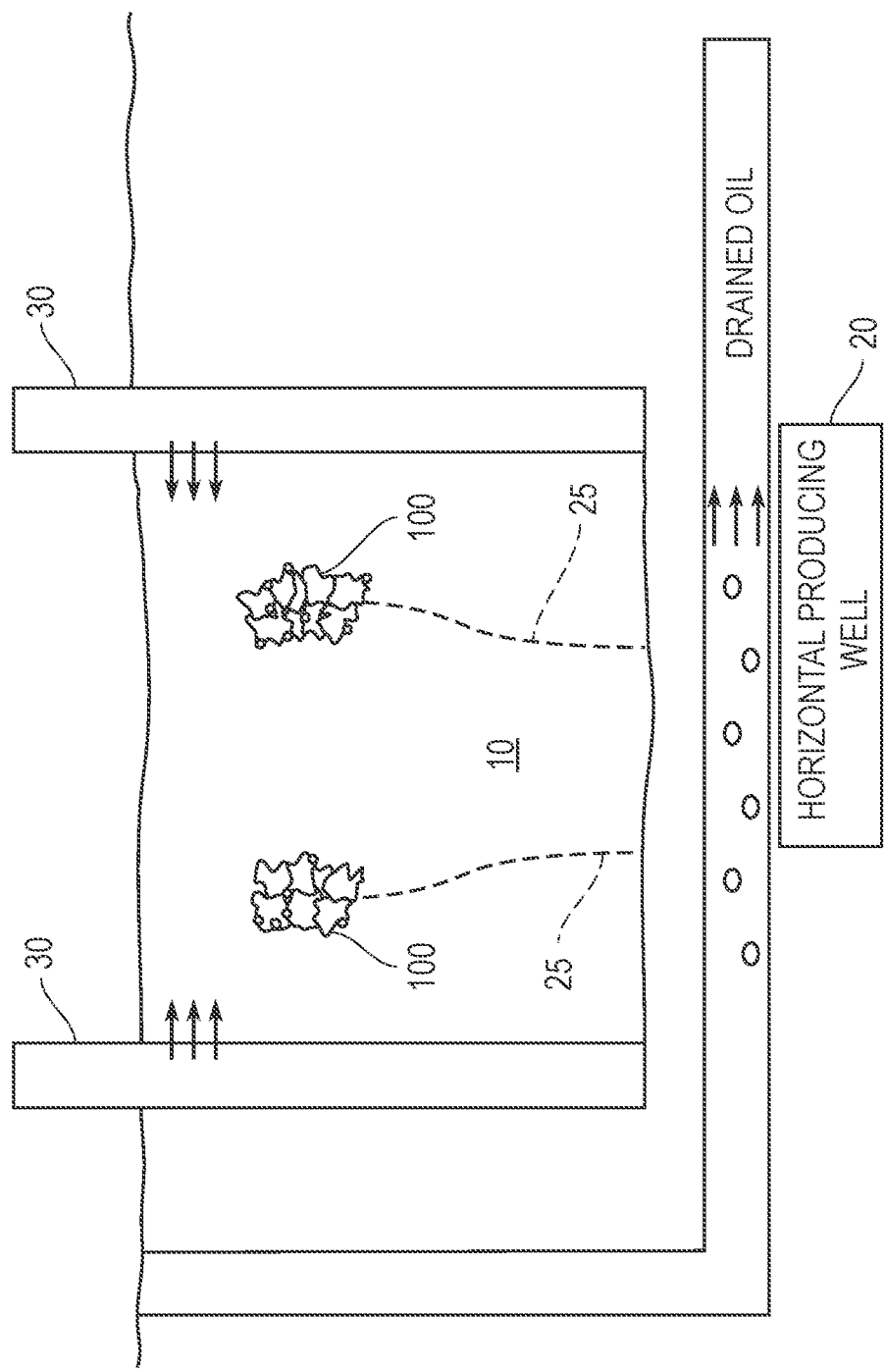
Figure 3:
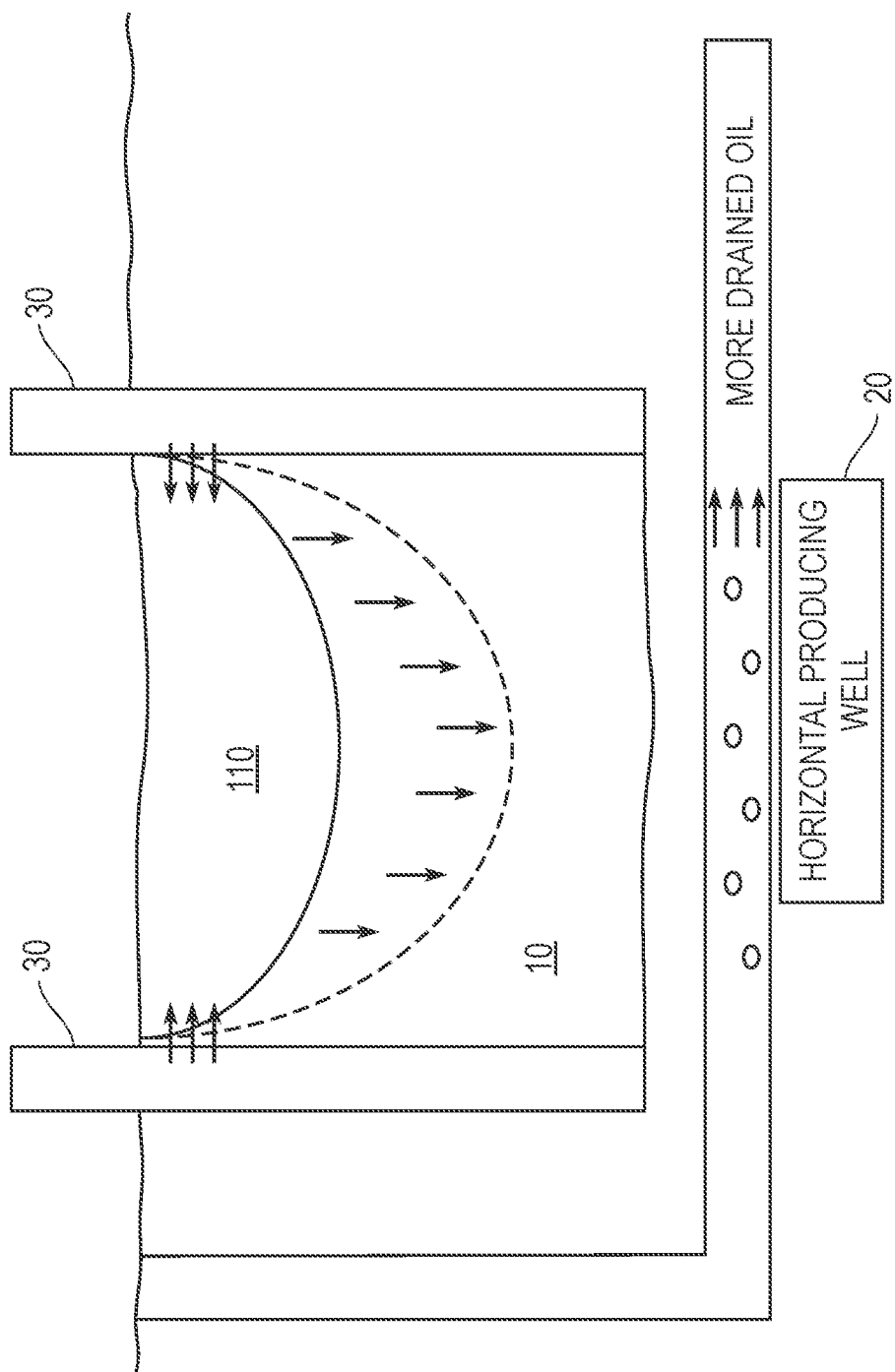

FIG. 1 is a schematic illustrating gas channeling issues in a typical gravity drainage $CO_2$ gas injection process;

FIG. 2 is a schematic illustrating the blockage of high permeability channels with in situ weak gels generated by the injection of gel forming solution containing polymer and crosslinking agent; and FIG. 3 is a schematic illustrating expanded $CO_2$ gas chamber, uniform sweep and higher oil recovery in gravity drainage $CO_2$ gas injection process due to the blockage of high permeability channels with gels.

DETAILED DESCRIPTION OF CERTAIN EMBODIMENTS

Gravity drainage gas injection processes are widely used for tertiary oil recovery in dipping reservoirs. Some recent studies also show the applicability of this process to even horizontal reservoirs. This technology is basically a top-down process, wherein CO2 is injected at the top of a pay zone using either vertical or horizontal wells to form a gas gap up dip. The CO2 gas is used due to its favorable phase behavior characteristics to interact with oil and cause oil swelling, viscosity reduction and lower gas-oil interfacial tension. At sufficient pressures, $CO_2$ can also develop miscibility conditions with oil by resulting in zero gas-oil interfacial tension to effectively mobilize residual oil in the swept areas. The formed gas cap expands slowly with time to improve the sweep and mobilize some residual oil. The mobilized oil is pushed towards down dip horizontal wells located at the bottom of pay zone through "film flow" and "gravity drainage".

The gas injection rate is one of the important operational parameters for gravity drainage $CO_2$ gas injection processes. The injection rates below a critical rate maintain the stability of the growing gas-oil interface that steadily moves towards down-dip producers. If the gas injection rate exceeds the critical rate, $CO_2$ gas fingers and channels through the pay zone thereby leading to premature breakthrough at the bottom horizontal well as shown in FIG. 1. To overcome this gas "short-circuiting" issue, oil production is maintained at slow rates in the bottom horizontal producing wells such that oil production rate is balanced by equivalent $CO_2$ injection volume. The interface between the advancing injection gas and the produced oil phase should be precisely controlled to stabilize gravitational forces and result in stable movement of gas-oil interface downward with the production withdrawal rate.

As previously mentioned, most gravity drainage projects do not look attractive for field practice due to slow response and low oil recovery rates. These delayed response and low oil recovery rates also consume much higher volume of injection gas for recovering a barrel of oil, which will not be economically feasible. Here we propose a methodology to fasten the oil recovery response as well as increase the production rates from gas gravity drainage processes by allowing the injection of gas at higher rates. If the gas injection rate is increased, it would enable faster recovery response due to the combined effects of forced gravity drainage with free gravity drainage. These favorable effects would enable higher oil production withdrawal rates and thereby increasing ultimate oil recoveries in producing wells.

Gels are commonly used for profile modification and achieve conformance improvement in reservoirs consisting of severe heterogeneity, fractured regions, and high permeability zones. The injection gas will quickly flow through high permeability channels due to much lower resistance to result in early gas breakthrough. The gels are generated in situ in the reservoir by injecting gel forming solutions, since gelling process occurs within the larger pores of reservoir rock. These gelants will preferentially enter the thief zones to form highly viscoelastic gels and block the high permeability channels to reduce their flow capacity. As a result, the subsequently injected gas will not be able to enter the high permeability channel, changes its flow direction, and gets diverted into unswept regions for increased volumetric sweep efficiency.

The present disclosure addresses and overcomes these issues by providing an improved system and method and more particularly, relates to improved gel formulations containing polymer solution and a crosslinking agent to generate in situ gels in the reservoir after injection of the gel formulations. The concentrations of polymer and crosslinking agent in the gel forming formulation are selected in such a way to form weak gels in the reservoir.

These weak gels of lower gel strength and delayed gelation times can propagate deeper in the reservoir and block the high permeability channels in the pay zone. Such blockage would reduce the overall permeability and subsequently the relative permeability of gas for the $CO_2$ gravity drainage process. As a result, $CO_2$ gas can be injected at higher gas injection rates to form a gas cap quickly at the top of the pay zone. The gas cap would expand with time and a forced gravity drainage would take place to supplement the free gravity drainage and increase the oil drainage rates. These high oil production rates would enable faster as well as higher ultimate recovery in $CO_2$ gravity drainage gas injection processes besides reducing the $CO_2$ gas utilization volumes per barrel of oil recovered, making the overall process more economically sound.

Now turning to FIGS. 2 and 3, an oil producing site is illustrated below the ground surface. A pay zone 10 is shown below the ground. The pay zone 10 is a term used to describe the reservoir that is producing oil or gas within a particular wellbore. A pay zone 10 is a reservoir or part of a reservoir that contains hydrocarbons that can be extracted economically.

In FIGS. 2 and 3, a horizontal producing well 20 is shown. As is known, a horizontal producing well is a type of directional drilling technique where an oil or gas well is dug at an angle of at least eighty degrees to a vertical wellbore. This technique has become increasingly common and productive in recent years. The circular dots in horizontal producing well 20 represent oil to be recovered. Gas channeling is depicted by lines 25.

FIG. 2 also shows placement of one or more vertical injection well 30. In FIG. 2, there are two vertical injection wells 30 that are located on either side of the pay zone 10. As shown, the vertical injections wells 30 are formed parallel to one another and are perpendicular to the ground surface and to the horizontal producing well 20. The vertical injections wells 30 do not intersect the horizontal producing well 20. As described herein, the two vertical injection wells 30 are formed and positioned for access to the pay zone 10. As described herein, it is the two vertical injections wells 30 that provide the vehicle by which the gel formulation solutions of the present disclosure are introduced into the pay zone 10.

In the figure, the injected gel formulation is generally depicted by 100. The gel formulation includes a polymer component and a crosslinking agent. In one aspect of the present disclosure, gel formulations disclosed herein are specifically intended for use in the method described herein and more particularly, the gel formulations are specifically formulated and intended for use with a subsequent gas ($CO_2$) injection.

This is in contrast to conventional gel systems that are intended for subsequent water floor or chemical flood. Gel systems proposed for subsequent water and chemical flooding processes will not optimally work with subsequent $CO_2$ gas injection due to the prevailing acidic (low pH) conditions. In other words, the gel systems disclosed herein are specifically tailored for use with subsequent $CO_2$ gas injection.

Polymer Component

As mentioned, one of the components of the gel formulation is a polymer component and in particular, is a polymer solution. The typical polymers used in the gel formulation solutions include polyacrylamide, hydrolyzed polyacrylamides, hydrophobically associating polymers, and sulfonated polyacrylamides.

Crosslinking Agent

As mentioned, one other component of the gel formulation is the crosslinking agent.

Suitable crosslinking agents that can be used in the gel formulation include but are not limited to metal ionic coordination compounds such as Chromium (III)-lactate, Chromium(III)-oxalate, Aluminum (III)-citrate, Chromium (III)-acetate, Titanium (III)-citrate, Zirconium (IV)-lactate, and organic systems like phenol-formaldehyde. The mixtures of metal ion and phenol-formaldehyde can also be used as crosslinker.

In one embodiment, the polymer component can consist of acrylamide based polymer or hydrophobically associative polymers with an inorganic metal ion type crosslinking agent such as chromium (III)-lactate, chromium (III)-oxalate, aluminum (III)-citrate, chromium (III)-acetate, titanium (III)-citrate, and zirconium (IV)-lactate.

In sum, the gel formulation solutions involve the addition of multivalent metal ions (crosslinking agent) to a polymer solution (polymer component) to initiate the reaction between the metal ion and the carboxyl group of polymer molecule. At polymer concentrations above the critical overlap concentration, the metal ion crosslink between polymer molecules. The continued chain reactions of the intermolecular crosslinking would lead to the formation of 3-dimensional polymer molecule networks to cause gelation. The formulations with prolonged gelation times are desired so that it provides sufficient length of time to ensure the formation of gel in the desired region (deep inside the reservoir).

In a first example, a weak gel was prepared and comprised 2000 ppm hydrolyzed polyacrylamide (HPAM) polymer and 500 ppm Aluminum based crosslinker in 5,000 ppm TDS salinity water comprising of 200 ppm divalent cations. In a second example, a weak get was prepared and comprised 1500 ppm associative polymer (AP) with 300 ppm Chromium based crosslinker in 30,000 ppm TDS salinity water comprising of 1000 ppm divalent cations. In a third example, 1200 ppm AMPS (12-Acrylamide-2Methyl Propane-Sulfonate) polymer with 500 ppm phenol-formaldehyde/Titanium based crosslinker in 60,000 ppm TDS salinity water comprising of 3,000 ppm divalent cations. In one embodiment, the gelation times can vary from 1 week to 4 weeks depending on the polymer and crosslinker concentrations; the ratios between these two, the temperature and salinity. TDS salinity refers to total dissolved solids which is a measurement of all types of solid compounds in a given liquid sample which in the present invention is a saline water sample. TDS is expressed in terms of ppm. As is also known, salinity is the measurement of salt that is dissolved in a given liquid sample and is often expressed in g/kg Injection Medium In one embodiment, the injection medium for the gel composition is water.

The salinities of injection water used as the carrying medium for gel formulations disclosed herein can be within range from 2,000 ppm to 60,000 ppm, which would increase the gelation times and gel strengths thereby ensuring the propagation of gels deeper into the reservoir formations for effective blocking of high permeability channels.

The conventional bulk gels, such as ones used in water flood systems, have high gel strength, since high polymer concentrations (0.5-5.0 wt%) with crosslinkers are used to form strong gels. This can be effectively applied for near wellbore treatments. Due to high viscosity and quick gelation time, these strong gels cannot propagate deeper in reservoir formations. In contrast, weak gels rely on using lower concentrations of polymers (0.05 wt%-0.3%) with crosslinkers and are characterized by low viscosities and longer or delayed gelation times. As a result, these gels can travel deep in the reservoir and block high permeability zones/channels to reduce the overall permeability. As will be readily understood the expression "wt%" refers to weight percentage.

In one exemplary embodiment, the components include polymer, crosslinker and water. Polymer concentrations can range from 0.05 wt% to 0.3 wt%, crosslinker can be in the range of 0.005 to 0.1 wt% and salts can range from 0.2 to 6 wt%. The source of water can be either high salinity seawater or different lower salinity waters obtained by the blending of seawater with freshwater at different seawater/fresh water blending ratios including, but not limited to, 50:50, 25:75, 10:90, and 5:95.

The proposed methodology first involves the injection of small pore volumes of polymer solution and a crosslinking agent at lower concentrations to form in-situ weak gels and block the high permeability channels (FIG. 2). As mentioned, FIG. 2 is a schematic showing the injection of the gel formulation and the blockage of high permeability channels 25 with in situ weak gels generated by the injection of gel forming solution containing the polymer component and the crosslinking agent.

Smaller pore volume means injecting relatively lower volume of a chemical solution comprising of polymer, crosslinker, and salt water. Lower concentrations refer to using dilute concentrations of both polymer and cross-linker chemicals in gel forming solutions.

The gel formulation solutions preferentially enter the high permeability zones due to low resistance and the gelation occurs to block the high permeability channels 25.

Then, with reference to FIG. 3, inject CO2 gas at a higher injection rate (due to reduced permeability and blockage of high permeability zones with weak gels) to delay gas break through, fasten the response time and effectively mobilize larger volumes of oil for higher oil recover. The blocking of high permeability channels 25 caused by in situ weak gels in the preconditioning step reduces the relative permeability to CO2 gas thereby effectively enabling the use of higher gas injection rates. This would also activate forced gravity drainage to supplement the free gravity drainage to increase the oil drainage rates and subsequently result in faster as well as higher ultimate recovery.

FIG. 3 shows a schematic showing expanded $CO_2$ gas chamber 110, uniform sweep and higher oil recovery in gravity drain $CO_2$ gas injection process due to the blockage of high permeability channels 25 with the present gels.

Exemplary Method

In accordance with one exemplary embodiment, a method to improve the efficiency of gravity drainage CO2 gas injection processes. The exemplary method includes the following steps. First, inject a slug of 0.05 to 0.5 PV gel forming solution (gel formulation) containing 500 to 3000 ppm polymer and a crosslinker concentration in the range of 50 to 1000 ppm. The other components in water include salinity and divalent cations. The salinity can range from 2,000 ppm TDS to 60,000 ppm TDS and divalent cations (calcium and magnesium ions) can range from 50 ppm to 3,000 ppm.

Pore volume represents the storage capacity of reservoir rock (void space volume). It is defined as average area*net thickness*porosity. Smaller pore volume represents the relatively lower volume of gel forming solution to be injected.

These injection solutions provide sufficient volumes to propagate deeper and generate in situ weak gels in the reservoir to effectively block the high permeability channels 25 in the pay zone 10. Such blockage would reduce the relative permeability of $CO_2$ gas and, subsequently, increase the $CO_2$ gas injection rate to be used for the later gravity drainage process in the given formation. Next, continuously inject $CO_2$ gas at the top of the pay zone 10 to form a gas cap 50 (FIG. 3) at higher injection rate due to the reduced permeability and lowered relative permeability of the $CO_2$ gas. The higher gas injection rates would quickly form a gas cap at the top of the reservoir and the gas front would advance rapidly towards the producing well at the bottom to provide the uniform sweep. The typical gas injection rates in a vertical well can range from 5 MMSCF/D to 10 MMSCF/D. The gel treatment according to the present disclosure can increase these gas injection rates by 20-50% without causing the channeling of gas to the bottom horizontal well. Forced gravity drainage would also supplement free gravity drainage to increase the oil drainage rates and cause the enhanced film flow of mobilized oil. The oil recovery response will be fastened in the producing well with higher production rates thereby reducing the utilization volume of $CO_2$ per barrel of oil produced.

The proposed method thus involves preconditioning the pay zone with the injection of gel forming solutions containing polymer and a crosslinking agent. These solutions of lower chemical concentrations have delayed gelation times and can propagate deeper in reservoir formations to generate weak gels in situ to block the high permeability channels. Because of such blockage of high permeability channels, the $CO_2$ gas can be injected at a higher rate to result in enhanced oil drainage rates with faster recovery response.

Traditional gravity drainage gas injection processes even though highly effective in mobilizing residual oil, their real applications are limited for field practice due to delayed response and low oil recovery rates in producing wells. These limitations are due to much lower gas injection rates used in these processes to avoid early and premature breakthrough of gas in producing wells. The present method overcomes these deficiencies by preconditioning the pay zone 10 with the injection of small pre volume (PV) solution consisting of polymer and a crosslinking agent to form in situ weak gels. These gels block the high permeability channels 25 by forming a barrier to reduce the overall permeability. As a result, $CO_2$ gas can be injected at a higher rate to increase the oil rates due to the combined effects both free- and forced-gravity drainage besides fastening the oil recovery response.

The salinity and divalent cation ranges provided can differentiate these gel solution formulations over traditional ones from water chemistry point of view.

The proposed methodology involving the injection of gel formulations will extend the applicability of traditional gravity drainage gas injection processes to high permeability and heterogeneous reservoirs.

The use of gel formulations prior to CO2 gas injection will reduce the CO2 gas utilization volumes per bbl of oil recovered to increase the economic viability of gravity stable gas injection process for different reservoirs.

The injection water preparation method has also been provided for formulating gel solutions, which includes the blending of seawater with fresh water at different volumetric ratios ranging from 100:0, 50:50; 25:75; 10:90; and 5:95.

It is to be understood that like numerals in the drawings represent like elements through the several figures, and that not all components and/or steps described and illustrated with reference to the figures are required for all embodiments or arrangements.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed is:

1. A method to improve the efficiency of a gravity drainage $CO_2$ gas injection process comprising the steps of:
    injecting a slug proximate to an underground reservoir, wherein the slug comprises a polymer component and an inorganic metal ion crosslinking agent that are configured to form an in situ weak gel in the reservoir to block high permeability channels in a pay zone of the reservoir, wherein the polymer component comprises AMPS (12-Acrylamide-2Methyl Propane-Sulfonate) polymer and the inorganic metal ion crosslinking agent comprises a phenol-formaldehyde/titanium based crosslinker; and
    continuously injecting $CO_2$ gas a top of the pay zone to form a gas cap at the top of the reservoir and to cause the gas cap to advance rapidly towards a producing well located below to provide a uniform sweep of the gas cap.

2. The method of claim 1, wherein the slug comprises a 0.05 to 0.5 PV gel forming solution containing 500 to 2000 ppm of the polymer component and the crosslinking agent in a concentration in a range of 50 to 1000 ppm.

3. The method of claim 1, wherein the step of injecting the slug comprises using a pair of vertical gas injection wells with the pay zone located therebetween.

4. The method of claim 1, wherein the polymer component has a concentration of between 0.05 wt% to 0.2 wt%.

5. The method of claim 1, wherein the slug is injected along with injection water which acts as a carrying medium for the slug, the injection water having a salinity between 2000 ppm to 60000 ppm.

6. The method of claim 1, wherein the polymer component is a sulfonated polyacrylamide.

7. The method of claim 1, wherein a gelation time period for the situ weak gel is between one week and four weeks.

8. The method of claim 1, further including the step of performing a forced gravity drainage operation.

9. The method of claim 1, wherein the slug comprises a weak gel.

10. The method of claim 9, wherein the weak gel comprises 1200 ppm AMPS (12-Acrylamide-2Methyl Propane-Sulfonate) polymer with 500 ppm phenol-formaldehyde/

Titanium based crosslinker in 60,000 ppm TDS salinity water comprising of 3,000 ppm divalent cations.

* * * * *